United States Patent
Park et al.

(10) Patent No.: US 7,527,682 B2
(45) Date of Patent: May 5, 2009

(54) INK COMPOSITION FOR INKJET RECORDING, INK CARTRIDGE INCLUDING THE INK COMPOSITION, AND INKJET RECORDING APPARATUS INCLUDING THE INK CARTRIDGE

(75) Inventors: Hyo-keun Park, Yongin-si (KR); Cheol Ham, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 12/037,242

(22) Filed: Feb. 26, 2008

(65) Prior Publication Data
US 2009/0000510 A1    Jan. 1, 2009

(30) Foreign Application Priority Data
Jun. 29, 2007    (KR) .................. 10-2007-0065663

(51) Int. Cl.
C09D 11/02    (2006.01)
B41J 2/01     (2006.01)

(52) U.S. Cl. .................. 106/31.43; 106/31.75; 347/100
(58) Field of Classification Search .............. 106/31.43, 106/31.75; 347/100
See application file for complete search history.

(56) References Cited

U.S. PATENT DOCUMENTS

| | | | | |
|---|---|---|---|---|
| 5,757,408 | A * | 5/1998 | Malhotra | 347/105 |
| 5,885,336 | A * | 3/1999 | Kitahara et al. | 106/31.27 |
| 6,592,657 | B2 * | 7/2003 | Lee et al. | 106/31.43 |
| 6,623,915 | B1 * | 9/2003 | Haye et al. | 430/490 |
| 6,685,770 | B2 * | 2/2004 | Adachi et al. | 106/31.43 |
| 6,966,944 | B2 * | 11/2005 | Shimomura et al. | 106/31.43 |
| 7,278,724 | B2 * | 10/2007 | Horii et al. | 347/95 |
| 7,288,144 | B2 * | 10/2007 | Uozumi et al. | 106/31.75 |
| 7,393,397 | B2 * | 7/2008 | Ham | 106/31.58 |
| 7,485,178 | B2 * | 2/2009 | Ham | 106/31.43 |
| 2005/0223939 | A1 * | 10/2005 | Uozumi et al. | 106/31.75 |
| 2007/0040881 | A1 * | 2/2007 | Ham et al. | 106/31.43 |
| 2008/0289536 | A1 * | 11/2008 | Ham | 106/31.13 |

FOREIGN PATENT DOCUMENTS

| | | |
|---|---|---|
| JP | 8-337747 | 12/1996 |
| JP | 2004-78197 | 3/2004 |

* cited by examiner

*Primary Examiner*—Helene Klemanski
(74) *Attorney, Agent, or Firm*—Stanzione & Kim, LLP

(57) ABSTRACT

An ink composition is provided for inkjet recording including a compound represented by Formula 1, a coloring agent, and water, the ink composition having characteristics that prevent formation of depositions therein over time to obtain high storage stability and good ejection properties.

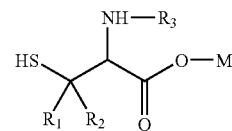

<Formula 1> wherein $R_1$ and $R_2$ are each independently, hydrogen, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_3$-$C_{20}$ cyclic alkyl group, or a substituted or unsubstituted $C_2$-$C_{20}$ hetero atom-containing cyclic alkyl group,
$R_3$ is hydrogen, a formyl group or an acetyl group, and
M is hydrogen, Na, K, Li, an ammonium ion or an anilinium ion.

7 Claims, 2 Drawing Sheets

INK COMPOSITION FOR INKJET RECORDING, INK CARTRIDGE INCLUDING THE INK COMPOSITION, AND INKJET RECORDING APPARATUS INCLUDING THE INK CARTRIDGE

CROSS-REFERENCE TO RELATED APPLICATIONS

This application claims priority under 35 U.S.C. §119(a) from Korean Patent Application No. 10-2007-0065663, filed on Jun. 29, 2007, in the Korean Intellectual Property Office, the disclosure of which is incorporated herein in its entirety by reference.

BACKGROUND OF THE INVENTION

1. Field of the Invention

The present general inventive concept relates to an ink composition, an ink cartridge including the ink composition, and an inkjet recording apparatus including the ink cartridge, and more particularly, to an ink composition for inkjet recording which has characteristics to prevent formation of depositions therein over time in a thermal-type inkjet printer to obtain high storage stability and good ejection properties, an ink cartridge including the ink composition, and an inkjet recording apparatus including the ink cartridge.

2. Description of the Related Art

Inkjet recording can be performed with low noise and at high speed. As such, inkjet recording methods are attracting more and more attention. In inkjet printers, a highly flowable liquid is ejected from a thin nozzle to be recorded on a medium. Inkjet printers are categorized into on-demand ejection type inkjet printers and continuous ejection type inkjet printers.

An ink for high-speed inkjet printers should be able to be manipulated into ink droplets having a uniform size, and should be able to be ejected at a uniform speed and in a uniform direction through a nozzle. When inkjet recording is performed many times, a heater of a recording head may be destroyed and as such the ink cannot be ejected, or depositions can build up on the heater and thus thermal energy of the heat cannot be efficiently transferred. In addition, there is a need to reduce a number of cleaning processes required by preventing formation of depositions in nozzles. Furthermore, ink should be stably stored. If ink is unstably stored, ink injection is unstable and thus images to be formed can be skipped or recorded in a lower than desired concentration.

Japanese Patent Laid-open Publication No. hei 8-337747 relates to an aqueous ink having storage stability and ejection stability containing an inorganic sulfate that makes a polyvalent metal ion soluble in water. Specifically, ink ejection stability can be obtained in such a manner that a metal ion in the ink is captured by a sulfuric ion to prevent formation of a low-soluble complex due to coordination of the metal ion with an anion, such as a carboxylic acid induced from an additive.

As another method of obtaining ink stability, an impurity, such as a metal ion, generated when a dye is synthesized can be removed from the dye. However, even when an impurity, such as a metal ion, is removed by refining of the ink, depositions of the dye are generated because thermal decomposition of the dye in the ink cannot be avoided.

According to a method to improve a long-term storage stability of an aqueous ink, a chelating agent can be added to ink for inkjet recording to mask a metal ion in dye so that blockages in printing heads due to a metal ion can be prevented. In general, an ethylenediamine tetraacetic acid (EDTA) salt or the like are usually used as a chelating agent. When the concentration of such a chelating agent is high, a surface layer of a heater gradually corrodes and thus a thickness of the surface layer is reduced. Consequently, after a predetermined time period, the surface layer corrodes completely and the heater is short-circuited.

Accordingly, the techniques described above are not sufficient to completely prevent formation of depositions, and other known methods also have limited effects or side effects.

SUMMARY OF THE INVENTION

The present general inventive concept provides an ink composition for inkjet recording which has characteristics to prevent formation of depositions therein over time in a thermal-type inkjet printer to obtain high storage stability and a high ejection effect, an ink cartridge including the ink composition and the ink recording apparatus including the ink cartridge.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may also be achieved by providing an ink composition for inkjet recording including a coloring agent, water, and a compound represented by Formula 1:

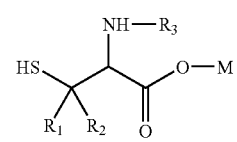

<Formula 1> wherein $R_1$ and $R_2$ are each independently, hydrogen, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_3$-$C_{20}$ cyclic alkyl group, or a substituted or unsubstituted $C_2$-$C_{20}$ hetero atom-containing cyclic alkyl group;

$R_3$ is hydrogen, a formyl group or an acetyl group; and

M is hydrogen, Na, K, Li, an ammonium ion or an anilinium ion.

The foregoing and/or other aspects and utilities of the general inventive concept may also be achieved by providing an ink cartridge including the ink composition.

The foregoing and/or other aspects and utilities of the general inventive concept may also be achieved by providing an inkjet recording apparatus including the ink cartridge.

The foregoing and/or other aspects and utilities of the general inventive concept may also be achieved by providing an ink composition usable with an inkjet recording apparatus, the ink composition including a coloring agent and a solvent including a chelating agent, wherein the chelating agent is dissolved in the solvent to capture one or more metal ions eluted therein.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
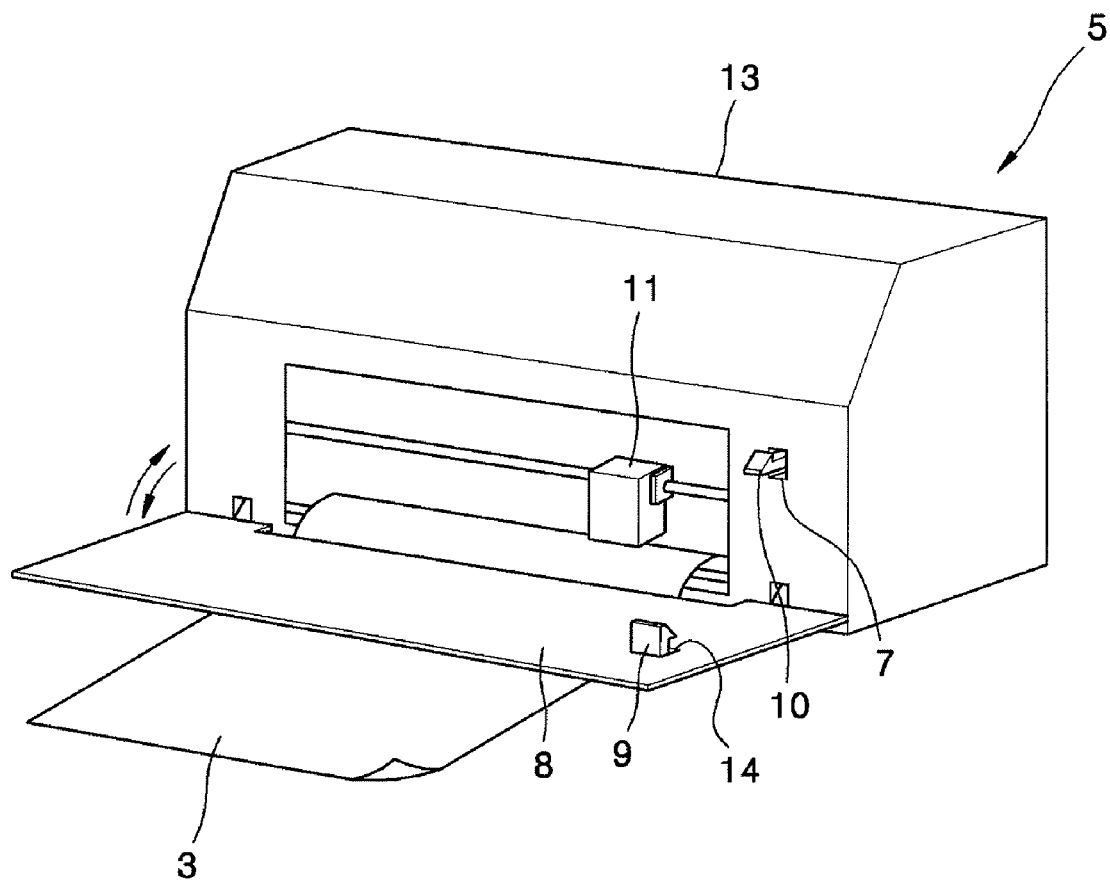
FIG. 1 is a perspective view illustrating an inkjet recording apparatus including an ink cartridge including an ink composition for inkjet recording including a coloring agent, water, and a compound represented by Formula 1 according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

An ink for inkjet recording according to an embodiment of the present general inventive concept includes a coloring agent and a solvent, wherein the solvent includes a chelating agent which is soluble with respect to the solvent. Herein, the expression "soluble with respect to the solvent" represents that the chelating agent is dissolved in a solvent to a degree that the chelating agent captures a metal ion eluted in the ink.

The chelating agent may be a compound represented by Formula 1:

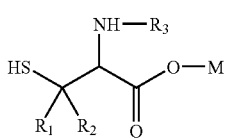

<Formula 1> wherein $R_1$ and $R_2$ are each independently, hydrogen, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_3$-$C_{20}$ cyclic alkyl group, or a substituted or unsubstituted $C_2$-$C_{20}$ hetero atom-containing cyclic alkyl group;

$R_3$ is hydrogen, a formyl group or an acetyl group; and

M is hydrogen, Na, K, Li, an ammonium ion or an anilinium ion.

Each substitutent described above is defined as follows.

The alkyl group refers to a linear or branched saturated monovalent hydrocarbon group having 1-20, such as 1-10 carbon atoms, and 1-6 carbon atoms. The unsubstituted alkyl group used according to the present embodiment can be methyl, ethyl, propyl, isobutyl, sec-butyl, tert-butyl, pentyl, iso-amyl, or hexyl. In the alkyl group, at least one hydrogen atom can be substituted with a halogen atom; a hydroxy group; a nitro group; a cyano group; a substituted or unsubstituted amino group, such as —$NH_2$, —NH(R), or —N(R')(R'') where R' and R'' are each independently a C1-10 alkyl group; an amidino group; a hydrazine or hydrazone group; a carboxylic group; a sulfonic acid; a phosphoric acid group; a $C_1$-$C_{20}$ alkyl group; a $C_1$-$C_{20}$ halogenized alkyl group; a $C_2$-$C_{20}$ alkenyl group; a $C_2$-$C_{20}$ alkynyl group; a $C_1$-$C_{20}$ heteroalkyl group; a $C_6$-$C_{20}$ aryl group; a $C_6$-$C_{20}$ arylalkyl group; a $C_6$-$C_{20}$ heteroaryl group; or a $C_6$-$C_{20}$ heteroarylalkyl group.

The alkenyl group refers to a linear or branched monovalent hydrocarbon group containing at least one C=C double bond and having 2-20 carbon atoms, such as 2-10 carbon atoms and 2-6 carbon atoms. The alkenyl group can be bonded through a carbon atom having a C=C double bond or through a saturated carbon atom. The alkenyl group can be substituted with one or more halogen substituent. The alkenyl group can be ethenyl, 1-propenyl, 2-propenyl, 2-butenyl, 3-butenyl, pentenyl, 5-hexenyl, or dodecenyl.

The alkynyl group refers to a linear or branched monovalent hydrocarbon group including one or more C=C triple bond having 2-20 carbon atoms, such as 2-10 carbon atoms and 2-6 carbon atoms. The linear or branched alkynyl group can be acetyrenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl, or 9-decynyl.

The aryl group refers to monovalent monocyclic, bicyclic or tricyclic aromatic hydrocarbon group having 6-20 carbon atoms, such as 6-18 cyclic carbon atoms. The aryl group can be substituted with one or more halogen substituents. In the aryl group, an aromatic part includes only carbon atoms. The aryl group can be phenyl, naphtalenyl or fluorenyl, and in the aryl, at least one hydrogen atom can be substituted with such substituents as in the case of the alkyl group.

The arylalkyl group refers to the aryl group described above having hydrogen atoms substituted with a lower alkyl, such as methyl, ethyl, or propyl. The arylalkyl group can be benzyl or phenylethyl. In the arylalkyl group, one ore more hydrogen atoms can be substituted with such substituents as in the case of the alkyl group.

The cyclic alkyl group refers to a monovalent monocyclic system having 3-20 carbon atoms, such as 3-10 carbon atoms and 3-6 carbon atoms. In the cyclic alkyl group, at least one hydrogen atom can be substituted with such substituents as in the case of the alkyl group.

The cyclic alkyl group having a hetero atom refers to a monovalent monocyclic system having 1, 2 or 3 hetero atoms selected from N, O, P and S and having 3-20 carbon atoms, such as 3-10 carbon atoms and 3-6 carbon atoms. In the cyclic alkyl, one or more hydrogen atom can be substituted with such substituents as in the case of the alkyl.

The amino group can be —$NH_2$, —NH(R) or —N(R')(R'') where R' and R'' are each independently C1-C10 alkyl.

The halogen can be F, Cl, Br, I, or At. In an embodiment, halogen is F.

An ink composition for inkjet recording according to the present embodiment includes a coloring agent and a solvent. The ink composition further includes a chelating agent that is soluble with respect to the solvent. Thus, the coloring agent or a derivative of the coloring agent, impurities generated when the coloring agent is synthesized, and metal atom ions from a container or an ink path are captured by the chelating agent and are dissolved in the solvent at the same time. Accordingly, the metal atom ions are not deposited in ink, and thus, formation of depositions over time can be prevented. Accordingly, the ink can obtain high storage stability and good ejection properties.

Furthermore, there is no need to limit a coloring agent used, to refine a coloring agent to increase its purity, or to use a solvent that causes less elution of a metal atom ion from a container or an ink path.

The chelating agent can be a penicillamine compound represented by Formula 1.

Examples of the penicillamine compound represented by Formula 1 used in the ink composition for inkjet recording according to an embodiment of the present general inventive concept include penicillamine represented by Formula 2 below, N-Formylpenicillamine represented by Formula 3 below, N-Acetyl-penicillamine represented by Formula 4 below, N-Acetyl-Beta-Mercaptoisoleucine represented by Formula 5 below, and derivatives thereof:

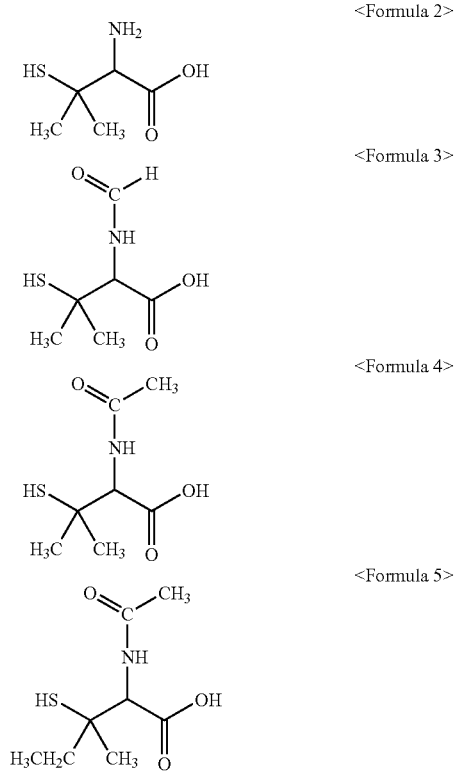

These penicillamine compounds can be used alone or in combination.

In the composition for inkjet recording according to the present embodiment, an amount of the compound represented by Formula 1 may be in the range from 0.0001 to 0.2 parts by weight, such as 0.0005 to 0.1 parts by weight and 0.001 to 0.05 parts by weight, based on 1 part by weight of the coloring agent. When the amount of the compound represented by Formula 1 is less than 0.0001 parts by weight, formation of depositions cannot be completely prevented. Alternatively, when the amount of the compound represented by Formula 1 is more than 0.2 parts by weight, solid deposits are formed and may plug nozzles, so that ink may not be smoothly ejected from the nozzles of an inkjet head.

The ink composition for inkjet recording according to the present embodiment includes water that acts as a solvent. According to the present embodiment, the amount of water may be in the range from 5 to 100 parts by weight, such as 7-70 parts by weight and 10-30 parts by weight, based on 1 part by weight of the coloring agent. When the amount of water is less than 5 parts by weight, the ink composition may have high viscosity which makes the ink composition difficult to eject. Alternatively, when the amount of water is more than 100 parts by weight, such effects as penetrability, dot forming ability, and drying property of a printed image on a recording medium such as a normal sheet or a professional sheet can not be obtained since it is difficult to control the surface tension of ink is difficult to control.

The ink composition may further include a water-soluble organic solvent. According to the present embodiment, the amount of the water-soluble organic solvent may be in the range from 0.1-50 parts by weight, such as 1-30 parts by weight and 2-10 parts by weight, based on 1 part by weight of the coloring agent. When the amount of the water-soluble organic solvent is less than 0.1 parts by weight, such effects as penetrability, dot forming ability, and drying property of a printed image on a recoding medium such as a normal sheet or a professional sheet cannot be obtained since the surface tension of ink is difficult to control. Alternatively, when the amount of the water-soluble organic solvent is more than 50 parts by weight, the ink composition may have high viscosity which makes it difficult to eject. The water-soluble organic solvent can be an aliphatic monovalent alcohol, a polyvalent alcohol, or a derivative of the polyvalent alcohol. When the ink composition further includes the water-soluble organic solvent, the weight ratio of water to the water-soluble organic solvent may be in the range from 1:0.02 to 1:1.

An aliphatic monovalent alcohol can enhance penetrability, dot forming ability and drying property of a printed image on a recoding medium such as a normal sheet or a professional sheet by controlling the surface tension of the ink composition. The polyvalent alcohol and a derivative thereof do not easily evaporate and decreases the freezing point of the ink composition to improve storage stability of the ink composition, thereby preventing plugging of nozzles.

The aliphatic monovalent alcohol can be a $C_1$-$C_{10}$ lower alcohol, such as methyl alcohol, ethyl alcohol, n-propyl alcohol, i-propyl alcohol, n-butyl alcohol, s-butyl alcohol or t-butyl alcohol. For example, the aliphatic monovalent alcohol can be ethyl alcohol, i-propyl alcohol, or n-butyl alcohol.

The polyvalent alcohol can be alkyleneglycols, such as ethyleneglycol, diethyleneglycol, triethyleneglycol, propyleneglycol, butyleneglycol, and glycerol; polyalkyleneglycols, such as polyethyleneglycol and polypropyleneglycol; thiodigylcols; or a blend thereof.

Examples of the polyvalent alcohol derivative include a lower alkylether of the polyvalent alcohol described above, and a lower carboxylic acid ester of the polyvalent alcohol described above. Specifically, the lower alkylethers of the polyvalent alcohol can be ethyleneglycoldimethylether, and a lower carboxylic acid ester of the polyvalent alcohol can be ethyleneglycoldiacetate.

A coloring agent used according to the present embodiment can be a self-dispersing dye, a self-dispersing pigment, or a conventional pigment or dye which is conventionally used as a dispersant. The coloring agent can be C.I. Basic Black 2, C.I. Direct Yellow 44, C.I. Basic Blue 26, C.I. Direct Red 227, Projet Fast Cyan 2 (Zeneca company), Projet Fast Magenta 2 (Zeneca company), Projet Fast Yellow 2 (Zeneca company), or Projet Fast Black 2 (Zeneca company), but is not limited thereto.

The ink composition for inkjet recording according to the present embodiment may further include other additives, such as a surfactant, a pH controlling agent, an antiseptic, or a chelating agent. Herein, the amount of all of the additives further included in the ink composition may be in the range from 0.01-2 parts by weight, such as 0.02-1.5 parts by weight, based on 1 part by weight of the coloring agent. When the amount of all of the additives is less than 0.01 parts by weight based on 1 part by weight of the coloring agent, there is no effect of adding the additives. Alternatively, when the amount of all of additives is greater than 2 parts by weight, the surface tension of the ink composition is too low. Accordingly, meniscus in nozzles of a chip is irregularly formed. Thus, ink leaks out to the surface of the nozzles, thereby degrading ejection properties.

The ink composition for inkjet recording according to the present embodiment can be prepared by uniformly mixing dye, water, and a water-soluble organic solvent using a conventional technique. At this time, use of the water-soluble organic solvent is optional.

The ink composition for inkjet recording according to the present embodiment can be used in a wide range of applications. For example, the ink composition can be used in, in addition to an ink, a toner composition, various types of paints, or coating solutions. Specifically, the ink composition can be used in an inkjet printer cartridge including an array head.

Unlike a shuttle-type inkjet printer to perform printing by transferring a single chip, an inkjet printer including an array head performs printing very quickly using a plurality of chips. Accordingly, if an array head is employed, a throughput of the inkjet printer can be increased.

An inkjet recording apparatus according to the present embodiment includes the ink cartridge including the ink composition for inkjet recording described above. FIG. 1 is a perspective view illustrating an inkjet recording apparatus according to an embodiment of the present general inventive concept.

Referring to FIG. 1, an inkjet recording apparatus according to an embodiment of the present general inventive concept includes an ink cartridge including the ink composition for inkjet recording which includes a coloring agent, water, and a compound represented by Formula 1. A printer cover 8 is connected to a body 13 of a printer 5 by a hinge. An engaged region of a movable latch 10 protrudes through a hole 7. The movable latch 10 is engaged with a fixed latch 9. When the printer cover 8 is closed, the movable latch 10 is engaged with the fixed latch 9, and the fixed latch 9 contacts the movable latch 10 within the inside of the printer cover 8. The printer cover 8 has a recess 14 corresponding to the engaged portion of a movable latch 10 extending through the hole 7. The ink cartridge 11 is located such that ink is doped on a printing medium such as a sheet of paper 3 passing under the ink cartridge 11.

Figure 2:
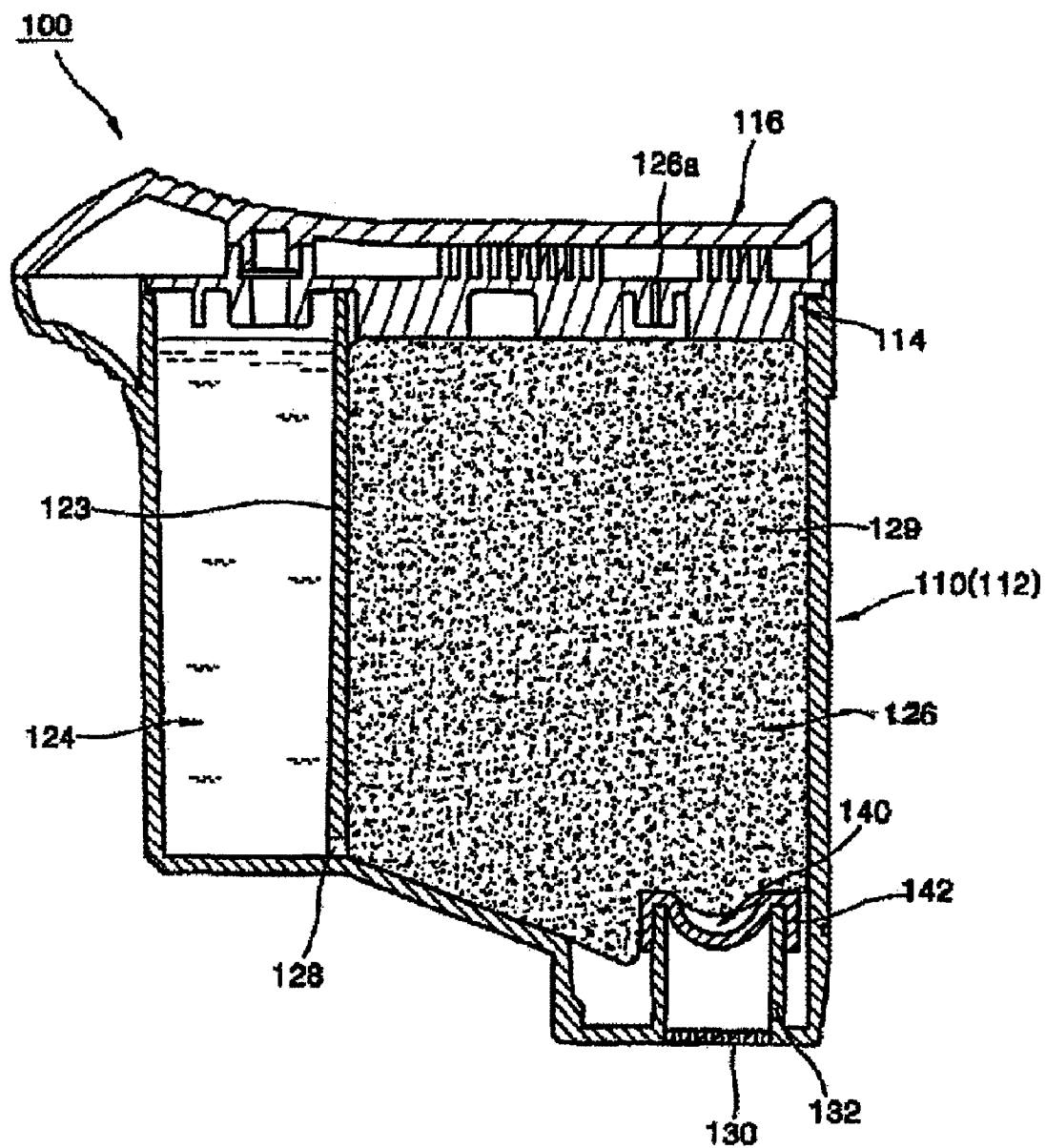
FIG. 2 is a horizontal and sectional view illustrating an ink cartridge including an ink composition for inkjet recording including a coloring agent, water, and a compound represented by Formula 1 according to an embodiment of the present general inventive concept.

FIG. 2 is a horizontal and sectional view illustrating an ink cartridge 100 including an ink composition for inkjet recording which includes a coloring agent, water, and a compound represented by Formula 1 according to an embodiment of the present general inventive concept.

Referring to FIG. 2, the ink cartridge 100 includes an ink cartridge body 110 to form an ink container 112, an inner cover 114 to cover the ink container 112, and an outer cover 116 separated from the inner cover 114 by a predetermined distance to seal the ink container 112 and the inner cover 114.

The ink container 112 is divided into first and second chambers 124 and 126 by a vertical barrier 123. An ink path 128 between the first and second chamber 124 and 126 is formed at the lowest portion of the vertical barrier 123. The first chamber 124 is filled with ink, and the second chamber 126 is filled with a sponge 129 and ink. A vent hole 126a corresponding to the second chamber 126 is formed on the inner cover 114.

A filter 140 is located in a lower portion of the second chamber 126 to filter the impurities and fine bubbles of ink so as to prevent plugging of a print head nozzle 130. A hook 142 is located on an edge of the filter 140 and on a higher portion of a standpipe 132. Ink is ejected in a form of droplets to a printing medium from the ink container 112 through the print head nozzle 130.

An embodiment of the present general inventive concept will be described in further detail with reference to the following examples. These examples are for illustrative purposes only and are not intended to limit the scope of the present general inventive concept.

Compounds given according to Examples 1-4 were completely mixed using a mixer to prepare ink compositions for inkjet recording according to Examples 1-4.

EXAMPLE 1

| | |
|---|---|
| C.I. Basic Black 2 | 4.5 parts by weight |
| glycerol | 7.5 parts by weight |
| diethyleneglycol | 12.0 parts by weight |
| Penicillamine | 0.006 parts by weight |
| water (deionized water) | 76 parts by weight |

EXAMPLE 2

| | |
|---|---|
| C.I. Direct Yellow 44 | 4.0 parts by weight |
| glycerol | 9.5 parts by weight |
| diethyleneglycol | 5.5 parts by weight |
| ethyleneglycol | 4.5 parts by weight |
| N-Formylpenicillamine | 0.005 parts by weight |
| water (deionized water) | 76.5 parts by weight |

EXAMPLE 3

| | |
|---|---|
| C.I. Basic Blue 26 | 4.5 parts by weight |
| diethyleneglycol | 9.5 parts by weight |
| ethyleneglycol | 10.5 parts by weight |
| N-Acetyl-penicillamine | 0.009 parts by weight |
| water (deionized water) | 75.5 parts by weight |

EXAMPLE 4

| | |
|---|---|
| C.I. Direct Red 227 | 3.5 parts by weight |
| glycerol | 10.5 parts by weight |
| diethyleneglycol | 4.5 parts by weight |
| ethyleneglycol | 5.5 parts by weight |
| N-Acetyl-Beta-Mercaptoisoleucine | 0.006 parts by weight |
| water (deionized water) | 76 parts by weight |

Compounds given according to Examples 1-4 were completely mixed using a mixer to prepare ink compositions for inkjet recording according to Comparative Examples 1-4.

COMPARATIVE EXAMPLE 1

| | |
|---|---|
| C.I. Basic Black 2 | 4.5 parts by weight |
| glycerol | 7.5 parts by weight |
| diethyleneglycol | 12.0 parts by weight |
| water (deionized water) | 76 parts by weight |

COMPARATIVE EXAMPLE 2

| | |
|---|---|
| C.I. Direct Yellow 44 | 4.0 parts by weight |
| glycerol | 9.5 parts by weight |
| diethyleneglycol | 5.5 parts by weight |
| ethyleneglycol | 4.5 parts by weight |
| water (deionized water) | 76.5 parts by weight |

COMPARATIVE EXAMPLE 3

| | |
|---|---|
| C.I. Basic Blue 26 | 4.5 parts by weight |
| diethyleneglycol | 9.5 parts by weight |
| ethyleneglycol | 10.5 parts by weight |
| water (deionized water) | 75.5 parts by weight |

COMPARATIVE EXAMPLE 4

| | |
|---|---|
| C.I. Direct Red 227 | 3.5 parts by weight |
| glycerol | 10.5 parts by weight |
| diethyleneglycol | 4.5 parts by weight |
| ethyleneglycol | 5.5 parts by weight |
| water (deionized water) | 76 parts by weight |
| Measurements | |
| Plugging of Nozzle | |

Plugging of Nozzle

Among the ink composition obtained according to Examples 1-4 and Comparative Examples 1-4, color ink was loaded to an ink cartridge C-60 (Samsung Electronics Co., Ltd.) and black ink was loaded to an ink cartridge M-50 (Samsung Electronics Co., Ltd.). These ink cartridges were left to sit at room temperature (25° C.) for two weeks and at low temperature (−18° C.) for another two weeks, and then, the number of times nozzle cleaning was required to be performed in order to allow normal printing was measured. The results are illustrated in Table 1.

A: Normal printing was performed after nozzle cleaning was performed once

B: Normal printing was performed after nozzle cleaning was performed 2 through 4 times C: Normal printing was performed after nozzle cleaning was performed 5 through 10 times D: Normal printing could not be performed even when nozzle cleaning was performed as much as 10 times Decrease in Ejection Speed Each of the ink composition prepared according to Examples 1-4 and Comparative Examples 1-4 was loaded to an inkjet printer including a heating device and then ejected to a sheet of normal paper. The initial ejection speed of an ink droplet, and the ejection speed of an ink droplet after 100,000,000 pulses were measured to identify a change in the ejection speed, that is, a decrease in the ejection speed (%). Results are illustrated in Table 1.

State of Cogation

After 100,000,000 pulses, formation of depositions on the surface of a thermal device, that is, state of cogation was identified using an optical microscope. In Table 1, "A" denotes when depositions do not exist at the surface of the heating device, "B" denotes when depositions exist in trace amounts at the surface of the heating device, and "C" denotes when depositions do exist in an effective amount at the surface of the heating device. Results are illustrated in Table 1.

TABLE 1

| | Plugging of Nozzle | Decrease in Ejection Speed (%) | State of Cogation |
|---|---|---|---|
| Example 1 | A | 12 | A |
| Example 2 | A | 10 | B |
| Example 3 | B | 13 | B |
| Example 4 | A | 15 | B |
| Comparative Example 1 | C | 91 | C |
| Comparative Example 2 | D | 65 | C |
| Comparative Example 3 | D | 54 | C |
| Comparative Example 4 | C | 38 | C |

Referring to Table 1, when the inkjet printing was performed using the ink compositions prepared according to Examples 1-4, each of which includes the compound represented by Formula 1, nozzle plugging was reduced. After 100,000,000 pulses, a decrease in ejection speed was less than 20%. Accordingly, the ink compositions for inkjet recording prepared according to Examples 1-4 were suitable for practical use was identified. When inkjet printing was performed using the ink compositions for inkjet recording prepared Examples 1, 3, and 4, the surface of the heating device was not substantially colored.

Alternatively, when inkjet printing was performed using the ink compositions prepared according to Comparative Examples 1-4, the nozzle was plugged to a high degree, and after 100,000,000 pulses, the decrease in ejection speed was more than 20%. Accordingly, the ink compositions for inkjet recording prepared according to Comparative Examples 1-4 were not suitable for practical use was identified. Specifically, in the case of the ink composition prepared according to Comparative Example 4, the ink composition could not be ejected since cogation occurred significantly, and a great amount of depositions were formed at the surface of the heating device of a printer nozzle.

Such results illustrate that when the ink composition for inkjet recording including the compound represented by Formula 1, according to various embodiments of the present general inventive concept, is used in a thermal inkjet printer head, nozzle plugging and cogation, that is, deposition of impurities at the surface of a heating device can be prevented.

An ink for inkjet recording according to various embodiments of the present general inventive concept can prevent plugging of a nozzle and formation of cogation when used for thermal inkjet recording so that ink droplets can be stably ejected from an inkjet printer head for a long period of time.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An ink composition for inkjet recording, comprising:
a coloring agent, water, and a compound represented by Formula 1:

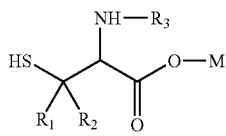

<Formula 1> wherein $R_1$ and $R_2$ are each independently, hydrogen, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_2$-$C_{20}$ aryl group, a substituted or unsubstituted $C_7$-$C_{20}$ arylalkyl group, a substituted or unsubstituted $C_3$-$C_{20}$ cyclic alkyl group, or a substituted or unsubstituted $C_2$-$C_{20}$ hetero atom-containing cyclic alkyl group;

$R_3$ is hydrogen, a formyl group or an acetyl group; and

M is hydrogen, Na, K, Li, an ammonium ion or an anilinium ion.

2. The ink composition of claim 1, wherein an amount of the compound represented by Formula 1 is 0.0001-0.2 parts by weight based on 1 part by weight of the coloring agent.

3. The ink composition of claim 1, wherein the compound represented by Formula 1 comprises:
penicillamine represented by Formula 2 below, N-Formyl-penicillamine represented by Formula 3 below, N-Acetyl-penicillamine represented by Formula 4 below, N-Acetyl-Beta-Mercaptoisoleucine represented by Formula 5 below, and mixtures thereof:

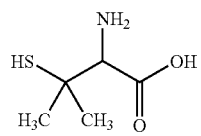

<Formula 2>

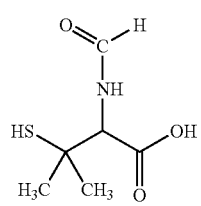

<Formula 3>

-continued

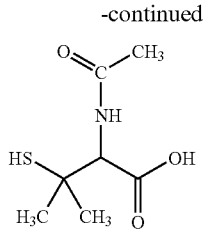

<Formula 4>

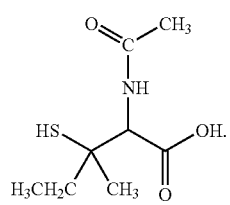

<Formula 5>

4. An ink cartridge, comprising:
an ink composition for inkjet recording,
wherein the ink composition comprises:
a coloring agent, water, and a compound represented by Formula 1:

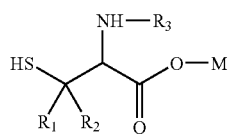

<Formula 1> wherein $R_1$ and $R_2$ are each independently, hydrogen, a substituted or unsubstituted $C_1$-$C_{20}$ alkyl group, a substituted or unsubstituted $C_2$-$C_{20}$ alkenyl group, a substituted or unsubstituted $C_7$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_3$-$C_{20}$ cyclic alkyl group, or a substituted or unsubstituted $C_2$-$C_{20}$ hereto atom-containing cyclic alkyl group;

$R_3$ is hydrogen, a formyl group or an acetyl group; and

M is hydrogen, Na, K, Li, an ammonium ion or an anilinium ion.

5. An inkjet recording apparatus, comprising:
an ink cartridge including an ink composition for ink recording,
wherein the ink composition comprises:
a coloring agent, water, and a compound represented by Formula 1:

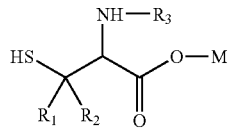

<Formula 1> wherein $R_1$ and $R_2$ are each independently, hydrogen, a substituted or unsubstituted $C_1$-$C_{20}$ alkyl group, a substituted or unsubstituted $C_2$-$C_{20}$ group, a substituted or unsubstituted $C_2$-$C_{20}$ alkynyl group, a substituted or unsubtituted $C_6$-$C_{20}$ aryl group, a substituted or unsubstituted $C_7$-$C_{20}$ arylalkyl group, a substituted or unsubstituted $C_3$-$C_{20}$ cyclic alkyl group, or a substituted or unsubstituted $C_2$-$C_{20}$ hereto atom-containing cyclic alkyl group;

$R_3$ is hydrogen, a formyl group or an acetyl group; and

M is hydrogen, Na, K, Li, an ammonium ion or an anilinium ion.

6. An ink composition usable with an inkjet recording apparatus, the ink composition comprising:

a coloring agent; and a solvent including a chelating agent, that is dissolved in the solvent to capture one or more metal ions eluted therein, the chelating agent represented by Formula 1:

<Formula 1>

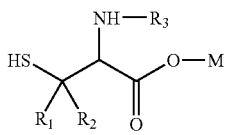

wherein $R_1$ and $R_2$ are each independently, hydrogen, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_7$-$C_{20}$ arylalkyl group, a substituted or unsubstituted $C_3$-$C_{20}$ cyclic alkyl group, or a substituted or unsubstituted $C_2$-$C_{20}$ hetero atom-contain in cyclic alkyl group:

$R_3$ is hydrogen, a formyl group or an acetyl group; and

M is hydrogen, Na, K, Li, an ammonium ion or an anilinium ion.

7. The ink composition of claim 6, wherein the chelating agent captures and dissolves simultaneously at least one of the coloring agent and a derivative of the coloring agent, impurities generated when the coloring agent is synthesized, and the one or more metal ions.

* * * * *